United States Patent
Fujita et al.

(10) Patent No.: US 10,112,146 B2
(45) Date of Patent: Oct. 30, 2018

(54) CARBON DIOXIDE CAPTURE SYSTEM

(71) Applicant: KABUSHIKI KAISHA TOSHIBA, Minato-ku (JP)

(72) Inventors: Koshito Fujita, Yokohama (JP); Hideo Kitamura, Katsushika (JP); Masatoshi Hodotsuka, Saitama (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 177 days.

(21) Appl. No.: 14/809,769

(22) Filed: Jul. 27, 2015

(65) Prior Publication Data
US 2016/0151742 A1 Jun. 2, 2016

(30) Foreign Application Priority Data
Dec. 1, 2014 (JP) .................. 2014-243518

(51) Int. Cl.
*B01D 53/62* (2006.01)
*B01D 53/78* (2006.01)
*B01D 53/14* (2006.01)

(52) U.S. Cl.
CPC .......... *B01D 53/78* (2013.01); *B01D 53/1475* (2013.01); *B01D 53/62* (2013.01);
(Continued)

(58) Field of Classification Search
CPC ...... B01D 2252/204; B01D 2258/0283; B01D 53/1475; B01D 53/62; B01D 53/78; Y02C 10/04; Y02C 10/06
See application file for complete search history.

(56) References Cited

U.S. PATENT DOCUMENTS 8,545,782 B1 10/2013 Tsujiuchi et al.
9,568,193 B2 2/2017 Oishi et al.
(Continued)

FOREIGN PATENT DOCUMENTS

CN 101874967 A 11/2010
CN 102078745 A 6/2011
(Continued)

OTHER PUBLICATIONS

Australian Office Action dated Aug. 30, 2016 in Patent Application No. 2015207966.
(Continued)

*Primary Examiner* — Cabrena Holecek
(74) *Attorney, Agent, or Firm* — Oblon, McClelland, Maier & Neustadt, L.L.P.

(57) ABSTRACT

A carbon dioxide capture system according to an embodiment includes an absorber, a stripper, and a heater. The absorber includes a first cleaning unit and a second cleaning unit. The first cleaning unit uses first cleaning liquid to clean combustion exhaust gas discharged from a carbon dioxide capturer and captures amine flowing together with the combustion exhaust gas. The second cleaning unit uses second cleaning liquid to clean the combustion exhaust gas discharged from the first cleaning unit and captures amine flowing together with the combustion exhaust gas. The heater heats the first cleaning liquid to a temperature higher than the temperature of an upper portion of the carbon dioxide capturer and of the second cleaning liquid.

10 Claims, 9 Drawing Sheets

(52) U.S. Cl.
CPC .................. *B01D 2252/204* (2013.01); *B01D 2258/0283* (2013.01); *Y02A 50/2342* (2018.01); *Y02C 10/04* (2013.01); *Y02C 10/06* (2013.01)

(56) References Cited

U.S. PATENT DOCUMENTS

| | | | |
|---|---|---|---|
| 2011/0135550 A1* | 6/2011 | Nagayasu | B01D 53/1418 423/230 |
| 2011/0168019 A1* | 7/2011 | Northrop | B01D 53/1406 95/186 |
| 2011/0308389 A1* | 12/2011 | Graff | B01D 53/1406 95/166 |
| 2012/0132443 A1 | 5/2012 | Van Straelen | |
| 2012/0263627 A1 | 10/2012 | Fujita et al. | |
| 2013/0291717 A1 | 11/2013 | Nagayasu et al. | |
| 2013/0327025 A1 | 12/2013 | Shimamura et al. | |
| 2014/0116251 A1* | 5/2014 | Bade | B01D 53/1475 95/156 |
| 2014/0241967 A1 | 8/2014 | Fujita et al. | |
| 2015/0241059 A1* | 8/2015 | Oishi | B01D 53/1475 423/220 |

FOREIGN PATENT DOCUMENTS

| | | |
|---|---|---|
| EP | 2 335 802 A2 | 6/2011 |
| EP | 2 514 509 A1 | 10/2012 |
| JP | 2011-115724 A | 6/2011 |
| WO | WO 2013/004731 A1 | 1/2013 |
| WO | WO 2014/057567 A1 | 4/2014 |
| WO | WO-2014057567 A1 * | 4/2014 ............. F23J 15/006 |

OTHER PUBLICATIONS

Extended European Search Report dated Apr. 29, 2016 in Patent Application No. 15178607.6.

* cited by examiner

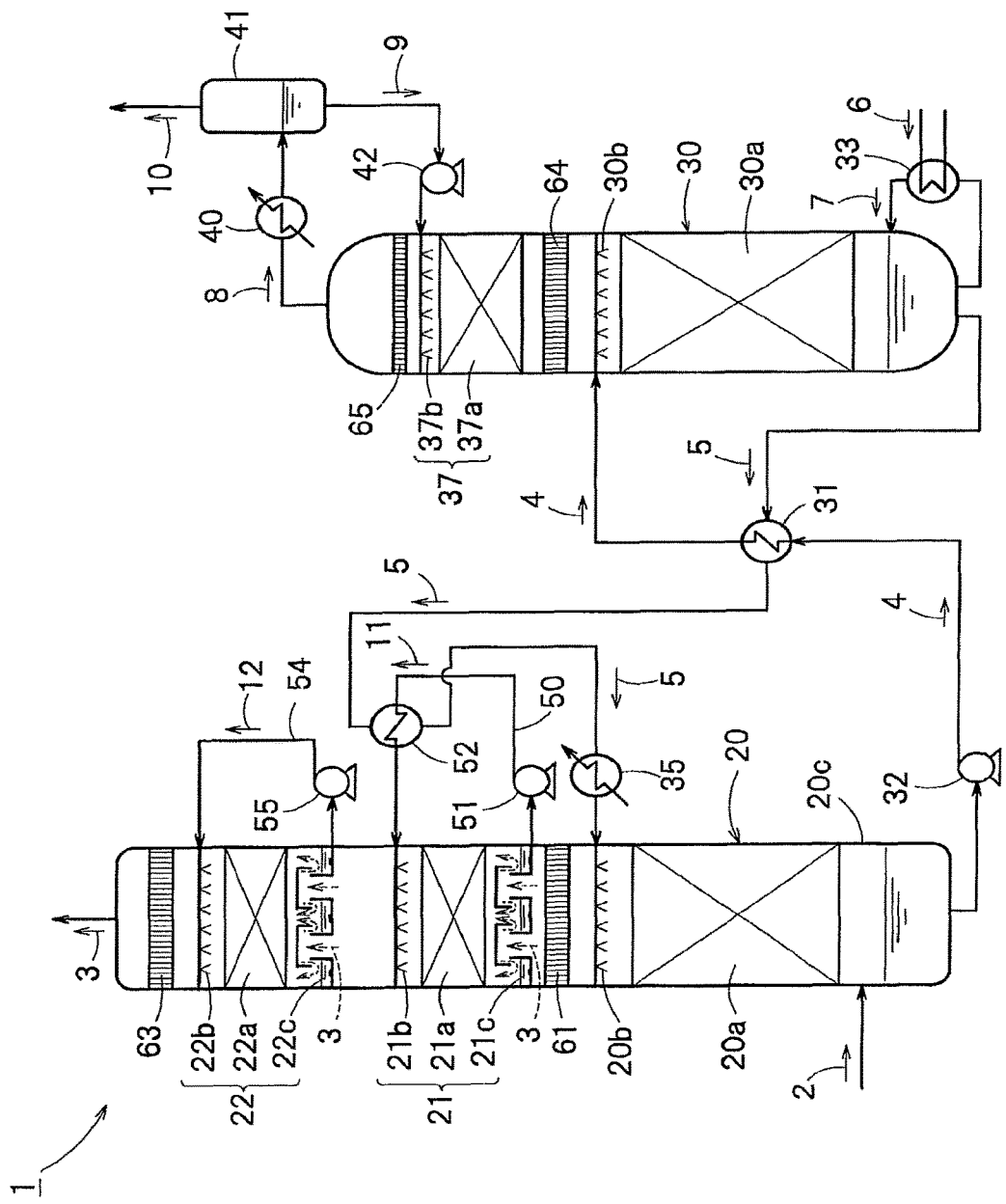
F I G. 1A

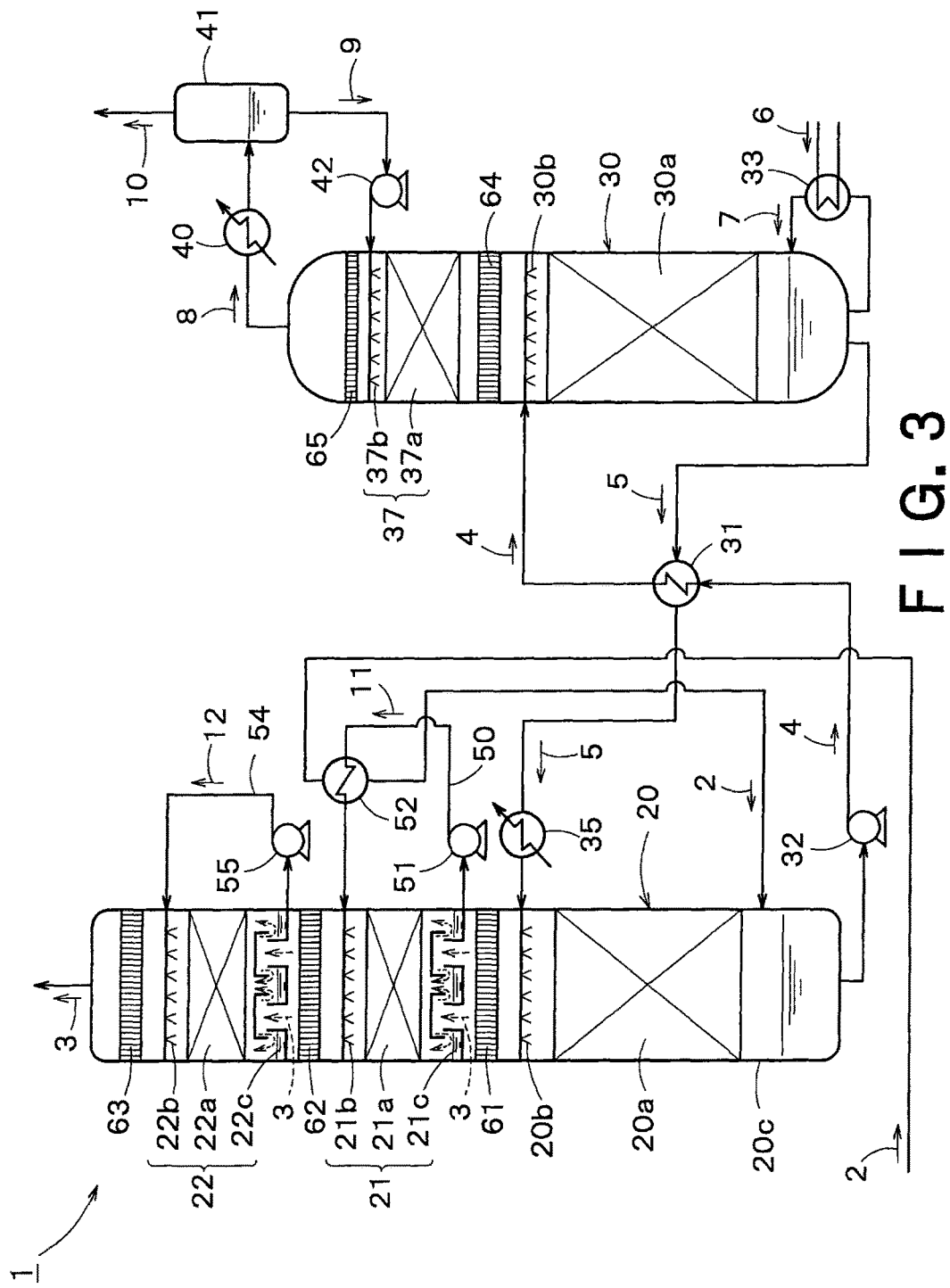
F I G. 3

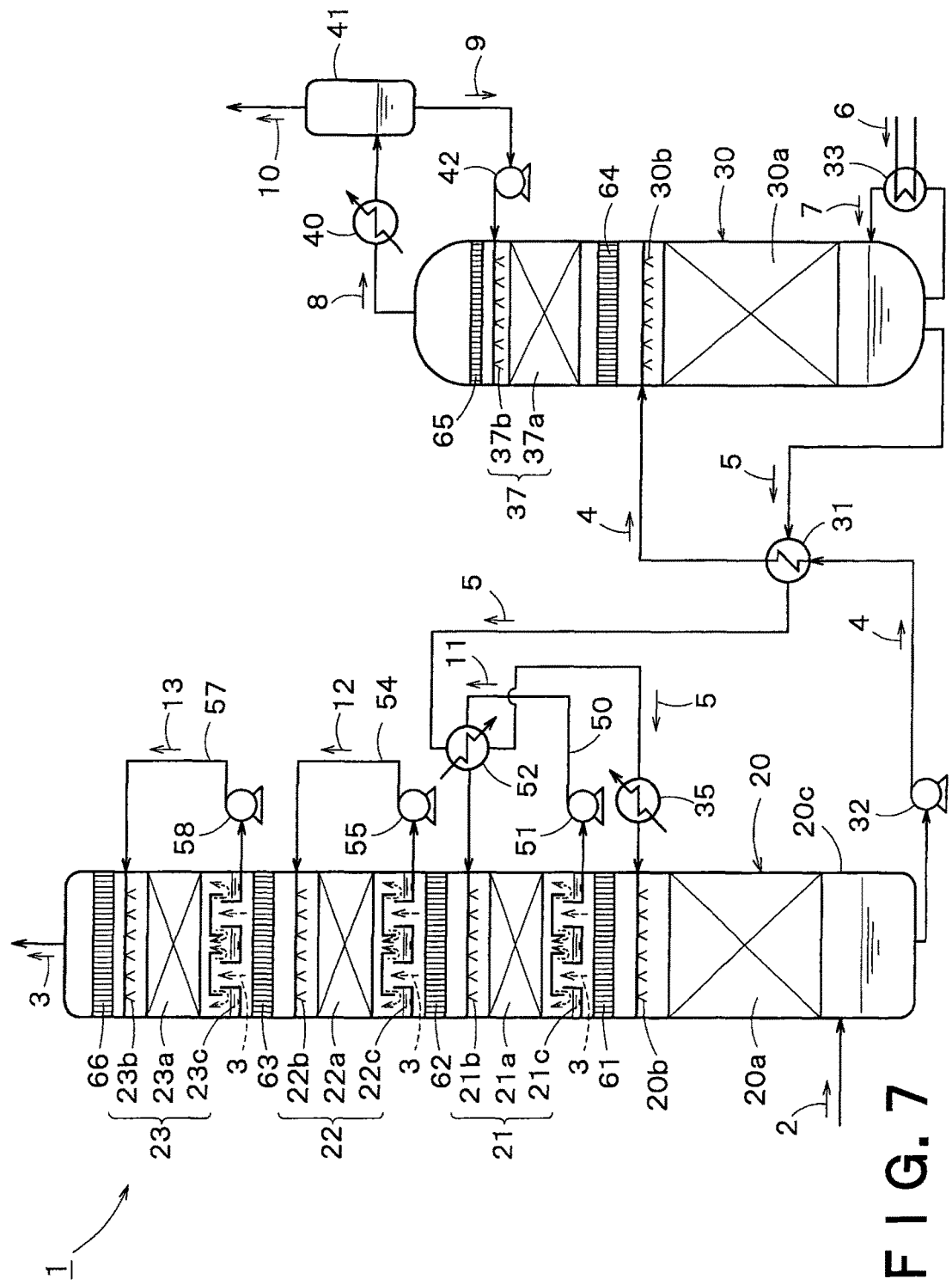
F I G. 7

CARBON DIOXIDE CAPTURE SYSTEM

CROSS-REFERENCE TO RELATED APPLICATIONS

This application is based upon and claims the benefit of priority from Japanese Patent Application No. 2014-243518, filed Dec. 1, 2014; the entire contents of which are incorporated herein by reference.

FIELD

Embodiments described herein relate generally to a carbon dioxide capture system.

BACKGROUND

In recent years, the greenhouse effect of carbon dioxide in combustion exhaust gas generated upon combustion of fossil fuels has been one of major causes of global warming. Each country addresses reductions of greenhouse gas emissions based on Kyoto Protocol to the United Nations Frameworks Convention on Climate Change to solve the problem.

Under such a circumstance, the study has been in progress on a carbon dioxide capture system that prevents the release into the air of carbon dioxide contained in combustion exhaust gas generated upon the combustion of a fossil fuel at thermal plants or other facilities where a large amount of the fossil fuel is consumed. Such a carbon dioxide capture system, after bringing the combustion exhaust gas into contact with an amine absorbing liquid, separates the carbon dioxide from the combustion exhaust gas and captures the separated carbon dioxide.

Specifically, the carbon dioxide capture system includes an absorber and a stripper. The absorber causes the carbon dioxide contained in the combustion exhaust gas to be absorbed in the amine absorbing liquid. The stripper heats the absorbing liquid (rich liquid) containing the absorbed carbon dioxide and supplied from the absorber, causes the carbon dioxide to be released from the rich liquid, and regenerates the absorbing liquid. The stripper is coupled to a reboiler configured to supply a heating source, and the rich liquid is heated within the stripper. The absorbing liquid (lean liquid) regenerated in the stripper is supplied to the absorber. The absorbing liquid circulates within the system.

In the carbon dioxide capture system, however, the combustion exhaust gas (decarbonated combustion exhaust gas) from which the carbon dioxide is absorbed in the amine absorbing liquid in the absorber is released together with amine into the air. Since a large amount of the combustion exhaust gas is discharged from the thermal plant or other facilities, a large amount of an amino group-containing component (amine) may be released together with the decarbonated combustion exhaust gas. Thus, when the carbon dioxide capture system is used in the thermal plant, it is desirable to efficiently reduce the amount of the amine to be released with the decarbonated combustion exhaust gas in the absorber into the air.

BRIEF DESCRIPTION OF THE DRAWINGS

FIG. 1A is a diagram illustrating an overall configuration of a carbon dioxide capture system according to a modified version of the first embodiment of the invention.

FIG. 3 is a diagram illustrating another modified example of the carbon dioxide capture system illustrated in FIG. 1.

FIG. 7 is a diagram illustrating an overall configuration of a carbon dioxide capture system according to a fifth embodiment of the invention.

DETAILED DESCRIPTION

A carbon dioxide capture system according to each embodiment includes: an absorber having a carbon dioxide capturer configured to cause carbon dioxide contained in combustion exhaust gas to be absorbed in an absorbing liquid containing amine; a stripper configured to cause the carbon dioxide to be released from the absorbing liquid containing the absorbed carbon dioxide and supplied from the absorber; and a heater. The absorber includes a first cleaning unit configured to use first cleaning liquid to clean combustion exhaust gas discharged from a carbon dioxide capturer and capture amine flowing together with the combustion exhaust gas and a second cleaning unit configured to use second cleaning liquid to clean combustion exhaust gas discharged from the first cleaning unit and capture amine flowing together with the combustion exhaust gas. The heater heats the first cleaning liquid to a higher temperature than the temperature of an upper portion of the carbon dioxide capturer and of the second cleaning liquid.

The carbon dioxide capture system according to each embodiment of the invention will be described with reference to the accompanying drawings.

First Embodiment

A carbon dioxide capture system according to a first embodiment of the invention will now be described with reference to FIG. 1.

Figure 1:
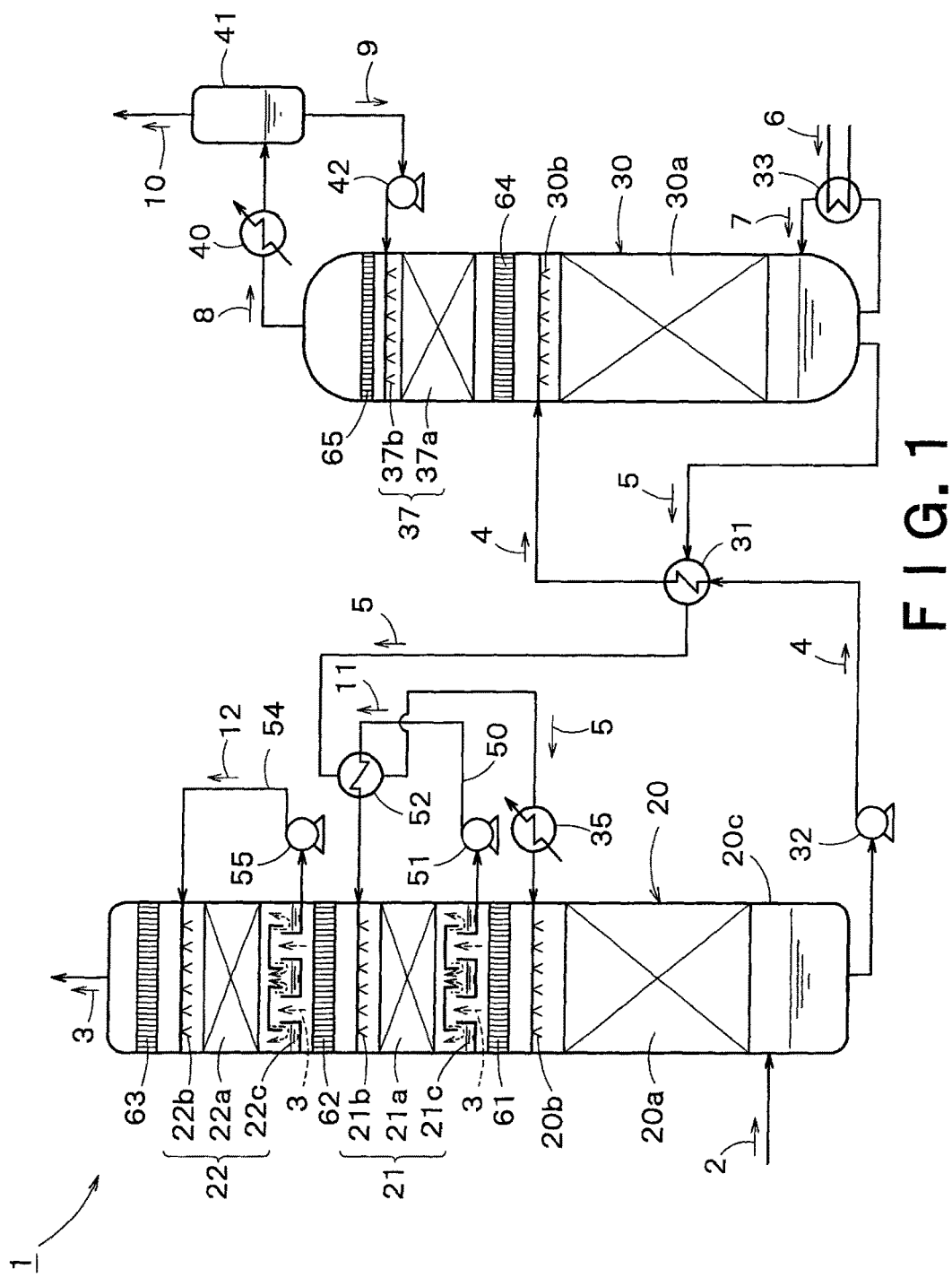
FIG. 1 is a diagram illustrating an overall configuration of a carbon dioxide capture system according to a first embodiment of the invention.

As illustrated in FIG. 1, the carbon dioxide capture system 1 includes an absorber 20 and a stripper 30. The absorber 20 causes carbon dioxide contained in combustion exhaust gas 2 to be absorbed in an absorbing liquid containing amine. The stripper 30 causes the carbon dioxide to be released from the absorbing liquid containing the absorbed carbon dioxide and supplied from the absorber 20 and regenerates the absorbing liquid. The combustion exhaust gas 2 from which the carbon dioxide is absorbed in the absorbing liquid in the absorber 20 is discharged as decarbonated combustion exhaust gas 3 from the absorber 20. In addition, the carbon dioxide is discharged as carbon dioxide-containing gas 8 (carbon dioxide-containing steam) together with steam from the stripper 30. The combustion exhaust gas 2 supplied to the absorber 20 is not limited to but may be combustion exhaust gas discharged from a boiler (not illustrated) of a thermal plant or process exhaust gas. It may be supplied to the absorber 20 after being subjected to a cooling process as appropriate.

The absorbing liquid circulates between the absorber 20 and the stripper 30. The absorbing liquid absorbs the carbon dioxide so as to become a rich liquid 4 in the absorber 20 and releases the carbon dioxide so as to become a lean liquid 5 in the stripper 30. The absorbing liquid is not limited to but may be the following: alcoholic hydroxyl group-containing primary amine such as monoethanolamine or 2-amino-2-methyl-1-propanol; alcoholic hydroxyl group-containing secondary amine such as diethanolamine or 2-methylaminoethanol; alcoholic hydroxyl group-containing tertiary amine such as triethanolamine or n-methyldiethanolamine; polyethylene polyamine such as ethylenediamine, triethylenediamine, or diethylenetriamine; cyclic amine such as piperazine, piperidine, or pyrrolidine; poly amine such as xylylenediamine; an amino acid such as a methylaminocarboxylic acid; or a mixture of these. These amine compounds are normally used as aqueous solutions containing the amine compounds in weight percentages of 10 wt % to 70 wt %. A carbon dioxide absorption promoter or a corrosion inhibitor may be added to the absorbing liquid. As other media, methanol, polyethyleneglycol, or sulfolane may be added to the absorbing liquid.

The absorber 20 includes a carbon dioxide capturer 20a (packed bed), a liquid diffuser 20b, and a container 20c. The carbon dioxide capturer 20a causes carbon dioxide contained in the combustion exhaust gas 2 to be absorbed in a lean liquid 5. The liquid diffuser 20b is arranged above the carbon dioxide capturer 20a and configured to diffuse and drop the lean liquid 5 supplied from the stripper 30 toward the carbon dioxide capturer 20a. The container 20c houses the carbon dioxide capturer 20a and the liquid diffuser 20b. The carbon dioxide capturer 20a is configured as a countercurrent gas-liquid contact device. A first cleaning unit 21 (described later), a second cleaning unit 22 (described later), and demisters 61, 62, and 63 (described later) are housed in the container 20c. The absorber 20 receives the combustion exhaust gas 2 from a lower portion of the container 20c and discharges the decarbonated combustion exhaust gas 3 (described later) from a top portion of the container 20c.

The combustion exhaust gas 2 that contains the carbon dioxide and is discharged from an external (such as the aforementioned reboiler) arranged outside the carbon dioxide capture system 1 is supplied by a blower (not illustrated) to a lower portion of the absorber 20 and ascends through the carbon dioxide capturer 20a within the absorber 20. The lean liquid 5 is supplied from the stripper 30 to the liquid diffuser 20b, diffused and dropped by the liquid diffuser 20b, and supplied to the carbon dioxide capturer 20a. In the carbon dioxide capturer 20a, the lean liquid 5 comes into contact with the combustion exhaust gas 2 and then absorbs the carbon dioxide contained in the combustion exhaust gas 2, generating the rich liquid 4.

The generated rich liquid 4 is temporarily stored in the lower portion of the absorber 20 and discharged from the lower portion. The carbon dioxide is released from the combustion exhaust gas 2 that has come into contact with the lean liquid 5. The combustion exhaust gas 2 further ascends as the decarbonated combustion exhaust gas 3 from the carbon dioxide capturer 20a within the absorber 20.

A heat exchanger 31 is provided between the absorber 20 and the stripper 30. A rich liquid pump 32 is arranged between the absorber 20 and the heat exchanger 31. The rich liquid discharged from the absorber 20 is supplied by the rich liquid pump 32 through the heat exchanger 31 to the stripper 30. The heat exchanger 31 causes heat transfer between the rich liquid 4 supplied from the absorber 20 to the stripper 30 and the lean liquid 5 supplied from the stripper 30 to the absorber 20. The lean liquid 5, after the heat transfer, serves as a heating source to heat the rich liquid 4 to a desired temperature. In other words, the rich liquid 4 serves as a cooling source to cool the lean liquid 5 to a desired temperature.

The stripper 30 includes an amine regenerator 30a (packed bed) and a liquid diffuser 30b. The amine regenerator 30a is configured to cause the carbon dioxide to be released from the rich liquid 4. The liquid diffuser 30b is arranged above the amine regenerator 30a and configured to diffuse and drop the rich liquid 4 supplied from the absorber 20 toward the amine regenerator 30a. The amine regenerator 30a is configured as a countercurrent gas-liquid contact device.

The stripper 30 is coupled to a reboiler 33. The reboiler 33 uses a heating medium 6 to heat the lean liquid 5 supplied from the stripper 30 to generate steam 7. The reboiler 33 supplies the generated steam 7 to the stripper 30. Specifically, a part of the lean liquid 5 discharged from a lower portion of the stripper 30 is supplied to the reboiler 33, while at the same time high-temperature steam is supplied as the heating medium 6 from an external, such as a turbine (not illustrated), to the reboiler 33. The lean liquid 5 supplied to the reboiler 33 exchanges heat with the heating medium 6 so as to be heated and thus generates the steam 7 from the lean liquid 5. The generated steam 7 is supplied to the lower portion of the stripper 30 and heats the lean liquid 5 within the stripper 30. The heating medium 6 is not limited to the high-temperature steam supplied from the turbine.

The steam 7 is supplied from the reboiler 33 to the lower portion of the stripper 30 and ascends toward the amine regenerator 30a within the stripper 30. The rich liquid 4 is supplied from the absorber 20 to the liquid diffuser 30b, diffused and dropped by the liquid diffuser 30b, and supplied to the amine regenerator 30a. In the amine regenerator 30a, the rich liquid 4 comes into contact with the steam 7 to make the carbon dioxide released from the rich liquid 4 and thus generates the lean liquid 5. The absorbing liquid is regenerated in the stripper 30 in this manner.

The generated lean liquid 5 is discharged from the lower portion of the stripper 30. The steam 7 that has come into contact with the rich liquid 4 and contains carbon dioxide is discharged as carbon dioxide-containing gas 8 from an upper portion of the stripper 30. The discharged carbon dioxide-containing gas 8 contains steam.

A lean liquid pump (not illustrated) is provided between the stripper 30 and the heat exchanger 31. The lean liquid 5 discharged from the stripper 30 is supplied by the lean liquid pump through the aforementioned heat exchanger 31 to the absorber 20. The heat exchanger 31 causes the heat transfer between the lean liquid 5 supplied from the stripper 30 to the absorber 20 and the rich liquid 4 supplied from the absorber 20 to the stripper 30 to cool the lean liquid 5, as described above. A lean liquid cooler 35 is provided between the heat exchanger 31 and the absorber 20. A cooling medium such as cooling water is supplied from an external to the lean liquid cooler 35. The lean liquid cooler 35 uses the cooling medium to further cool the lean liquid 5 cooled by the heat exchanger 31 to a desired temperature.

The lean liquid 5 cooled by the lean liquid cooler 35 is supplied to the liquid diffuser 20b, diffused and dropped by the liquid diffuser 20b, and is supplied to the carbon dioxide capturer 20a. In the carbon dioxide capturer 20a, the lean liquid 5 subsequently comes into contact with the combustion exhaust gas 2, absorbs the carbon dioxide contained in the combustion exhaust gas 2, and turns into the rich liquid 4. In this manner, in the carbon dioxide capture system 1, the absorbing liquid circulates while repeatedly switching being the lean liquid 5 and being the rich liquid 4.

The carbon dioxide capture system 1 illustrated in FIG. 1 further includes a gas cooler 40 and a gas-liquid separator 41. The gas cooler 40 is configured to cool the carbon dioxide-containing gas 8 discharged from the upper portion of the stripper 30, condense steam, and generate condensed water 9. The gas-liquid separator 41 is configured to separate the condensed water 9 generated by the gas cooler 40 from the carbon dioxide-containing gas 8. The amount of water contained in the carbon dioxide-containing gas 8 is thus reduced. The carbon dioxide-containing gas 8 is consequently discharged as carbon dioxide gas 10 to be supplied to and stored in a facility (not illustrated). The condensed water 9 separated by the gas-liquid separator 41 is supplied by a condensed water pump 42 to the stripper 30 and mixes with the absorbing liquid. A cooling liquid (for example, cooling water) for cooling the carbon dioxide-containing gas 8 is supplied from an external to the gas cooler 40.

The absorber 20 includes the first cleaning unit 21 and the second cleaning unit 22. The first cleaning unit 21 is configured to use first cleaning liquid 11 to clean the decarbonated combustion exhaust gas 3 discharged from the carbon dioxide capturer 20a and capture the amine flowing together with the decarbonated combustion exhaust gas 3. The second cleaning unit 22 is configured to use second cleaning liquid 12 to clean the decarbonated combustion exhaust gas 3 discharged from the first cleaning unit 21 and capture the amine flowing together with the decarbonated combustion exhaust gas 3. The first cleaning unit 21 is arranged above the liquid diffuser 20b, while the second cleaning unit 22 is arranged above the first cleaning unit 21.

The first cleaning unit 21 includes a first capturer 21a (packed bed), a first liquid diffuser 21b, and first cleaning liquid storage part 21c. The first capturer 21a is configured to enable the first cleaning liquid 11 and the decarbonated combustion exhaust gas 3 to contact each other and capture the amine that is an absorbing liquid component flowing together with the decarbonated combustion exhaust gas 3. The first liquid diffuser 21b is arranged above the first capturer 21a and configured to diffuse and drop the first cleaning liquid 11 toward the first capturer 21a. The first cleaning liquid storage part 21c is arranged under the first capturer 21a and configured to store the first cleaning liquid 11 that has flowed downward from the first capturer 21a.

The first cleaning unit 21 is coupled to a first circulation line 50 configured to circulate the first cleaning liquid 11. Specifically, a first circulation pump 51 is arranged in the first circulation line 50. The first circulation pump 51 extracts the first cleaning liquid 11 stored in the first cleaning liquid storage part 21c and supplies the first cleaning liquid 11 to the first liquid diffuser 21b so as to enable the first cleaning liquid 11 to circulate. The first cleaning liquid 11 supplied to the first liquid diffuser 21b is diffused and dropped by the first liquid diffuser 21b and supplied to the first capturer 21a.

A heater 52 is arranged in the first circulation line 50 and configured to heat the first cleaning liquid 11. The heater 52 heats the first cleaning liquid 11 so that the first cleaning liquid 11 has a higher temperature than an upper portion of the carbon dioxide capturer 20a and the second cleaning liquid 12. The lean liquid 5 is supplied as the heating source for heating the cleaning liquid 11 from the stripper 30 through the heat exchanger 31 to the heater 52. In the first embodiment, the lean liquid 5 discharged from the heat exchanger 31 is supplied to the heater 52 and heats the first cleaning liquid 11. After that, the lean liquid 5 that has heated the first cleaning liquid 11 is supplied through the lean liquid cooler 35 and the liquid diffuser 20b to the carbon dioxide capturer 20a. The lean liquid 5 that has passed through the heat exchanger 31 typically has a higher temperature than that of the upper portion of the carbon dioxide capturer 20a. For this reason, the lean liquid 5 discharged from the heat exchanger 31 is used to heat the first cleaning liquid 11 to a temperature higher than the temperature of the upper portion of the carbon dioxide capturer 20a and the second cleaning liquid 12. In the first embodiment illustrated in FIG. 1, the heater 52 is arranged on the downstream (the side of the first liquid diffuser 21b) of the first circulation pump 51 in the first circulation line 50, but is not limited to this.

This configuration makes the decarbonated combustion exhaust gas 3 ascending from the carbon dioxide capturer 20a supplied to the first capturer 21a, and makes the first cleaning liquid 11 that has diffused and dropped from the first liquid diffuser 21b supplied to the first capturer 21a. In the first capturer 21a, the decarbonated combustion exhaust gas 3 comes into contact with the first cleaning liquid 11, and the amine contained in the decarbonated combustion exhaust gas 3 is absorbed and captured in the first cleaning liquid 11. This cleans the decarbonated combustion exhaust gas 3. The first cleaning liquid 11, used to clean the decarbonated combustion exhaust gas 3 in the first capturer 21a, flows downward from the first capturer 21a and is then stored in the first cleaning liquid storage part 21c. Since the first cleaning liquid 11 for cleaning the decarbonated combustion exhaust gas 3 is heated by the heater 52, the temperature of the decarbonated combustion exhaust gas 3 increases. The decarbonated combustion exhaust gas 3 cleaned by the first cleaning liquid 11 further ascends within the absorber 20.

The amine dissolves in the first cleaning liquid 11 at the time of the cleaning of the decarbonated combustion exhaust gas 3. This dissolution can lead to a higher concentration of the amine of the first cleaning liquid 11 upon repetition of the cleaning and thus lower the cleaning performance of the first cleaning unit 21. For this reason, the first cleaning liquid 11 may be constantly replaced with a new cleaning liquid to manage the quality of the first cleaning liquid 11. Alternatively, the pH value of the first cleaning liquid 11 may be measured, and in the event that the pH value exceeds a predetermined criterion value, the first cleaning liquid 11 may be replaced with new cleaning liquid.

The second cleaning unit 22 includes a second capturer 22a (packed bed), a second liquid diffuser 22b, and a second cleaning liquid storage part 22c. The second capturer 22a enables the second cleaning liquid 12 and the decarbonated combustion exhaust gas 3 to contact each other and captures the amine serving as the absorbing liquid component flowing together with the decarbonated combustion exhaust gas 3. The second liquid diffuser 22b is arranged above the second capturer 22a and configured to diffuse and drop the second cleaning liquid 12 toward the second capturer 22a. The second cleaning liquid storage part 22c is arranged under the second capturer 22a and configured to store the second cleaning liquid 12 that has flowed downward from the second capturer 22a.

The second cleaning liquid. 22 is coupled to a second circulation line 54 configured to circulate the second cleaning liquid 12. Specifically, a second circulation pump 55 is arranged in the second circulation line 54. The second circulation pump 55 extracts the second cleaning liquid 12 stored in the second cleaning liquid storage part 22c and supplies the second cleaning liquid 12 to the second liquid diffuser 22b so as to enable the second cleaning liquid 12 to circulate. The second cleaning liquid 12 supplied to the second liquid diffuser 22b is diffused and dropped by the second liquid diffuser 22b and supplied to the second capturer 22a.

The second cleaning liquid 22 is configured to exchange heat with the air. Specifically, a part of the container 20c of the absorber 20 facing the second cleaning unit 22 is exposed to the air. Similarly, the second circulation line 54 is configured to exchange heat with the air. This configuration enables the second cleaning liquid 12 to exchange heat with the air to be naturally cooled, maintains the temperature of the second cleaning liquid 12 at a level close to an ambient temperature, and prevents the temperature of the second cleaning liquid 22 from increasing.

The aforementioned configuration allows the decarbonated combustion exhaust gas 3 ascending from the first cleaning unit 21 to be supplied to the second capturer 22a, and the second cleaning liquid 12 that has diffused and dropped by the second liquid diffuser 22b to be supplied to the second capturer 22a. In the second capturer 22a, the decarbonated combustion exhaust gas 3 comes into contact with the second cleaning liquid 12, making the amine in the decarbonated combustion exhaust gas 3 absorbed and captured in the second cleaning liquid 12. This cleans the decarbonated combustion exhaust gas 3. The second cleaning liquid 12, after cleaning the decarbonated combustion exhaust gas 3 in the second capturer 22a, flows downward from the second capturer 22a and is then stored in the second cleaning liquid storage part 22c. The second cleaning liquid 12, having a lower temperature than the first cleaning liquid 11, cools the decarbonated combustion exhaust gas 3 to condense water contained in the decarbonated combustion exhaust gas 3. The condensed water is absorbed in the second cleaning liquid 12 to be mixed. The condensed water then falls from the second capturer 22a and is stored in the second cleaning liquid storage part 22c. The decarbonated combustion exhaust gas 3 that has been cleaned by the second cleaning liquid 12 further ascends within the absorber 20 to be discharged from the top of the absorber 20 and released into the air.

The amine dissolves in the second cleaning liquid 12 at the time of the cleaning of the decarbonated combustion exhaust gas 3. This dissolution can lead to a higher concentration of the amine contained in the second cleaning liquid 12 upon the repetition of the cleaning so as to reduce the cleaning performance of the second cleaning unit 22. For this reason, the cleaning liquid 12 may be constantly replaced with new cleaning liquid to manage the quality of the cleaning liquid 12. Alternatively, the pH value of the second cleaning liquid 12 may be measured, and in the event that the pH value of the second cleaning liquid 12 exceeds a predetermined criterion value, the second cleaning liquid 12 may be replaced with new cleaning liquid.

The stripper 30 further includes a stripper cleaning unit 37 configured to use the condensed water 9 to clean the carbon dioxide-containing gas 8 discharged from the amine regenerator 30a and capture the amine flowing together with the carbon dioxide-containing gas 8. The stripper cleaning unit 37 is arranged above the amine regenerator 30a.

The stripper cleaning unit 37 includes a stripper capturer 37a (packed bed) and a liquid diffuser 37b. The stripper capturer 37a is configured to enable the carbon dioxide-containing gas 8 and the condensed water 9 to contact each other and capture the amine from the carbon dioxide-containing gas 8. The liquid diffuser 37b, arranged above the stripper capturer 37a, diffuses and drops the condensed water 9 toward the stripper capturer 37a.

This configuration allows carbon dioxide-containing gas 7 ascending from the amine regeneration 30a to be supplied to the stripper capturer 37a. The condensed water 9, after being supplied from the condensed water pump 42 to the liquid diffuser 37b, diffuses and drops from the liquid diffuser 37b, and is then supplied to the stripper capturer 37a. In the stripper capturer 37a, the carbon dioxide-containing gas 8 and the condensed water 9 contact each other to make the amine in the carbon dioxide-containing gas 8 absorbed and captured in the condensed water 9. This absorption and capture clean the carbon dioxide-containing gas 8. Since the carbon dioxide-containing gas 8 is cooled by the condensed water 9, steam contained in the carbon dioxide-containing gas 8 is condensed to mix with the condensed water 9. The cleaned carbon dioxide-containing gas 8 ascends within the stripper 30 and is discharged from a top portion of the stripper 30. The condensed water 9, after cleaning the carbon dioxide-containing gas 8 in the stripper capturer 37a, falls from the stripper capturer 37a. The condensed water 9 is then supplied to the amine regenerator 30a to mix with the rich liquid 4.

The first demister 61 is arranged at an outlet of the carbon dioxide capturer 20a. Specifically, the first demister 61 is provided between the liquid diffuser 20b and the first cleaning liquid storage part 21c of the first cleaning unit 21. The first demister 61 allows the decarbonated combustion exhaust gas 3 discharged from the carbon dioxide capturer 20a to pass through before it ascends. At this time, the first demister 61 captures mist of the absorbing liquid flowing together with the decarbonated combustion exhaust gas 3.

The second demister 62 is arranged at an outlet of the first cleaning unit 21. Specifically, the second demister 62 is provided between the first liquid diffuser 21b of the first cleaning unit 21 and the second cleaning liquid storage part 22c of the second cleaning unit 22. The second demister 62 allows the decarbonated combustion exhaust gas 3 discharged from the first cleaning unit 21 to pass through before it ascends. At this time, the second demister 62 captures mist of the first cleaning liquid 11 and mist of the absorbing liquid flowing together with the decarbonated combustion exhaust gas 3.

The third demister 63 is arranged at an outlet of the second cleaning unit 22. Specifically, the third demister 63 is arranged above the second liquid diffuser 22b of the second cleaning unit 22 (or provided between the second liquid diffuser 22b and the top portion of the absorber 20). The third demister 63 allows the decarbonated combustion exhaust gas 3 discharged from the second cleaning unit 22 to pass through before it ascends. At this time, the third demister 63 captures mist of the first cleaning liquid 11, mist of the second cleaning liquid 12, and mist of the absorbing liquid flowing together with the decarbonated combustion exhaust gas 3.

A fourth demister 64 is arranged at an outlet of the amine regenerator 30a of the stripper 30. Specifically, the fourth demister 64 is provided between the liquid diffuser 30b and the stripper capturer 37a of the stripper cleaning unit 37. The fourth demister 64 allows the carbon dioxide-containing gas 8 discharged from the amine regenerator 30a to pass through before it ascends. At this time, the fourth demister 64 captures mist of the absorbing liquid flowing together with the carbon dioxide-containing gas 8.

A fifth demister 65 is arranged at an outlet of the stripper cleaning unit 37. Specifically, the fifth demister 65 is arranged above the liquid diffuser 37b (or provided between the liquid diffuser 37b and the top portion of the stripper 30). The fifth demister 65 allows the carbon dioxide-containing gas 8 discharged from the stripper cleaning unit 37 to pass through before it ascends. At this time, the fifth demister 65 captures mist of the condensed water 9 and mist of the absorbing liquid flowing together with the carbon dioxide-containing gas 8.

Action of the first embodiment describing the configuration will be described below.

Typical problems with a method of cleaning gas using the first cleaning unit 21 and the second cleaning unit 22 will now be described.

The first cleaning unit 21 and the second cleaning unit 22 are generally provided to capture the amine flowing together with the decarbonated combustion exhaust gas 3 and clean the decarbonated combustion exhaust gas 3. For larger areas where the decarbonated combustion exhaust gas 3 comes into contact with the cleaning liquid, the first capturer 21a and the second capturer 22a sometimes have shelf structures, but mostly have packed bed structures. The packed beds, however, can cause the following three problems.

[1] The cleaning liquid that flow downward on surfaces of the packed beds may easily drift. The drift, if occurs, may not make the overall surfaces of the packed beds wet (which causes a short path). The decarbonated combustion exhaust gas 3 will fail to contact the cleaning liquid and end up passing through the packed beds without being cleaned.

[2] The amine that is released together with the decarbonated combustion exhaust gas 3 into the air is in the form of gas or mist. The amine of mist is not easily captured by the packed beds. Thus, the demisters are arranged to capture the mist. The demisters, however, do not easily capture mist having diameters of 10 μm or less.

[3] The cleaning liquid that flow downward on the surfaces of the packed beds absorb the amine flowing together with the decarbonated combustion exhaust gas 3. The rate of absorbing the amine depends on the amine concentration of the cleaning liquid on gas-liquid contact interfaces and the amine concentration of the decarbonated combustion exhaust gas 3. In other words, as long as the amine concentration of the cleaning liquid on the gas-liquid contact interfaces is maintained low, the rate of absorbing the amine using the cleaning liquid will be maintained at a high level. The amine concentration of the cleaning liquid on the gas-liquid contact interfaces, however, immediately increases upon the absorption of the amine contained in the decarbonated combustion exhaust gas 3. The low rate of diffusing the amine contained in the cleaning liquid makes it difficult for the amine absorbed in the cleaning liquid on the gas-liquid contact interfaces to diffuse within the cleaning liquid. The amine concentration of the cleaning liquid on the gas-liquid contact interfaces is maintained high to cause a decline in the rate of absorbing the amine.

To solve these problems, the first embodiment makes use of a condensation effect. Specifically, in the first embodiment, the temperature of the second cleaning unit 22 is set lower than the temperature of the first cleaning unit 21, and the decarbonated combustion exhaust gas 3 discharged from the first cleaning unit 21 is cooled when passing through the second cleaning unit 22 so as to condense the water contained in the decarbonated combustion exhaust gas 3. The aforementioned problems can be solved using the condensed water.

Other two methods are proposed for setting the temperature of the second cleaning unit 22 to be lower than that of the first cleaning unit 21. One of them is heating the first cleaning unit 21. The other is cooling the second cleaning unit 22.

The cleaning liquid may be cooled to reduce pressure of amine steam contained in the cleaning liquid. However, the temperature of the cooled cleaning liquid approximately ranges from 20° C. to 30° C., while the temperature of typical cleaning liquid is set to be approximately in a range of 30° C. to 40° C. The cooling will not make much difference in the temperature of the cleaning liquid. It is thus difficult to obtain a large difference between the temperatures of the first and second cleaning units 21 and 22 by cooling the second cleaning liquid 12. If the second cleaning liquid 12 is cooled using a chiller with high cooling performance to increase the difference between the temperatures, the cooling will require a great amount of energy. One of big problems with the carbon dioxide capture system 1 is how the energy for capturing carbon dioxide will be reduced. Thus, the energy for cooling the decarbonated combustion exhaust gas 3 should not be larger.

The first embodiment makes use of waste heat obtained from an external (a peripheral facility) of the carbon dioxide capture system 1. Specifically, the waste heat is used to heat the first cleaning liquid 11 that is normally used at a room temperature or used at a cool temperature. The temperature of the first cleaning unit 21 is raised by the heating. The heating of the first cleaning liquid 11 makes larger the difference between the temperatures of the first and second cleaning units 21 and 22, increasing the amount of the condensed water within the second cleaning unit 22. The temperature of the first cleaning unit 21 is preferably higher by 5° C. to 50° C. than the temperature of the upper portion of the carbon dioxide capturer 20a, but is more preferably higher by 10° C. to 30° C.

The reasons that the condensation effect can be used to solve the aforementioned three problems will now be described below.

[1] Condensation occurs from the decarbonated combustion exhaust gas 3 flowing in a gap between the packed beds. The decarbonated combustion exhaust gas 3 uniformly flows in the packed beds. Thus, the condensed water can make the surfaces of the packed beds uniformly wet, thus preventing the decarbonated combustion exhaust gas 3 from passing through the packed beds without the gas 3 being cleaned.

[2] Condensation mainly results from mist of small particles. Increasing the amount of the condensed water is expected to make the diameters of the mist particles larger. With the diameters being larger, the mist can be easily captured by the packed beds or the demisters.

[3] Condensed water is absorbed in the cleaning liquid by increasing the amount of the condensed water. During the condensation, the gas-liquid contact interfaces of the cleaning liquid are replaced with the condensed water. This can keep the amine concentration of the cleaning liquid on the gas-liquid contact interfaces low, preventing a decline in the rate of absorbing amine.

The aforementioned three problems can be solved in these ways. The higher rate of absorbing the amine from the decarbonated combustion exhaust gas 3 can make it possible to efficiently capture the amine and prevent reduction in the amount of the amine captured.

According to the first embodiment, the first cleaning liquid 11 cleans the decarbonated combustion exhaust gas 3 discharged from the carbon dioxide capturer 20a of the absorber 20, the water 11 having a higher temperature than that of the upper portion of the carbon dioxide capturer 20a and of the second cleaning liquid 12. This cleaning can lead to the higher temperature of the first cleaning unit 21, increase the difference between the temperature of the first cleaning unit 21 and the temperature of the second cleaning unit 22, and thus elevate the amount of the condensed water obtained from the decarbonated combustion exhaust gas 3 passing through the second cleaning unit 22. The amount of the amine captured in the second cleaning unit 22 can also increase, resulting in the reduced amount of the amine released into the air.

In addition, according to the first embodiment, the lean liquid 5 serving as the heating source for heating the first cleaning liquid 11 is supplied from the stripper 30 through the heat exchanger 31 to the heater 52. This makes it possible to heat the first cleaning liquid 11 using the lean liquid 5, serving as waste heat, that has been discharged from the heat exchanger 31. The waste heat can be thus efficiently used as energy for heating the first cleaning liquid 11, preventing increase in the amount of energy to be used for the carbon dioxide capture system 1. At the same time, this prevention can decrease the cooling performance of the lean liquid cooler 35 so as to reduce the energy for the cooling. The lean liquid cooler 35 can be omitted accordingly.

In addition, according to the first embodiment, the second demister 62 is provided between the first cleaning unit 21 and the second cleaning unit 22. The second demister 62 can capture mist of the absorbing liquid and mist of the first cleaning liquid 11 from the decarbonated combustion exhaust gas 3 passing through the second demister 62, further reducing the amount of the amine to be released into the air. Further, according to the first embodiment, the third demister 63 is provided above the second cleaning unit 22. The third demister 63 can capture mist of the absorbing liquid, mist of the first cleaning liquid 11, and mist of the second cleaning liquid 12 from the decarbonated combustion exhaust gas 3 passing through the third demister 63, further reducing the amount of the amine to be released into the air.

The first embodiment has described the example in which the lean liquid 5 is supplied as the heating source for heating the first cleaning liquid 11 from the stripper 30 through the heat exchanger 31 to the heater 52. The first embodiment, however, is not limited to this example. The heater 52 can have any configuration as long as the heater 52 is capable of heating the first cleaning liquid 11.

Figure 2:
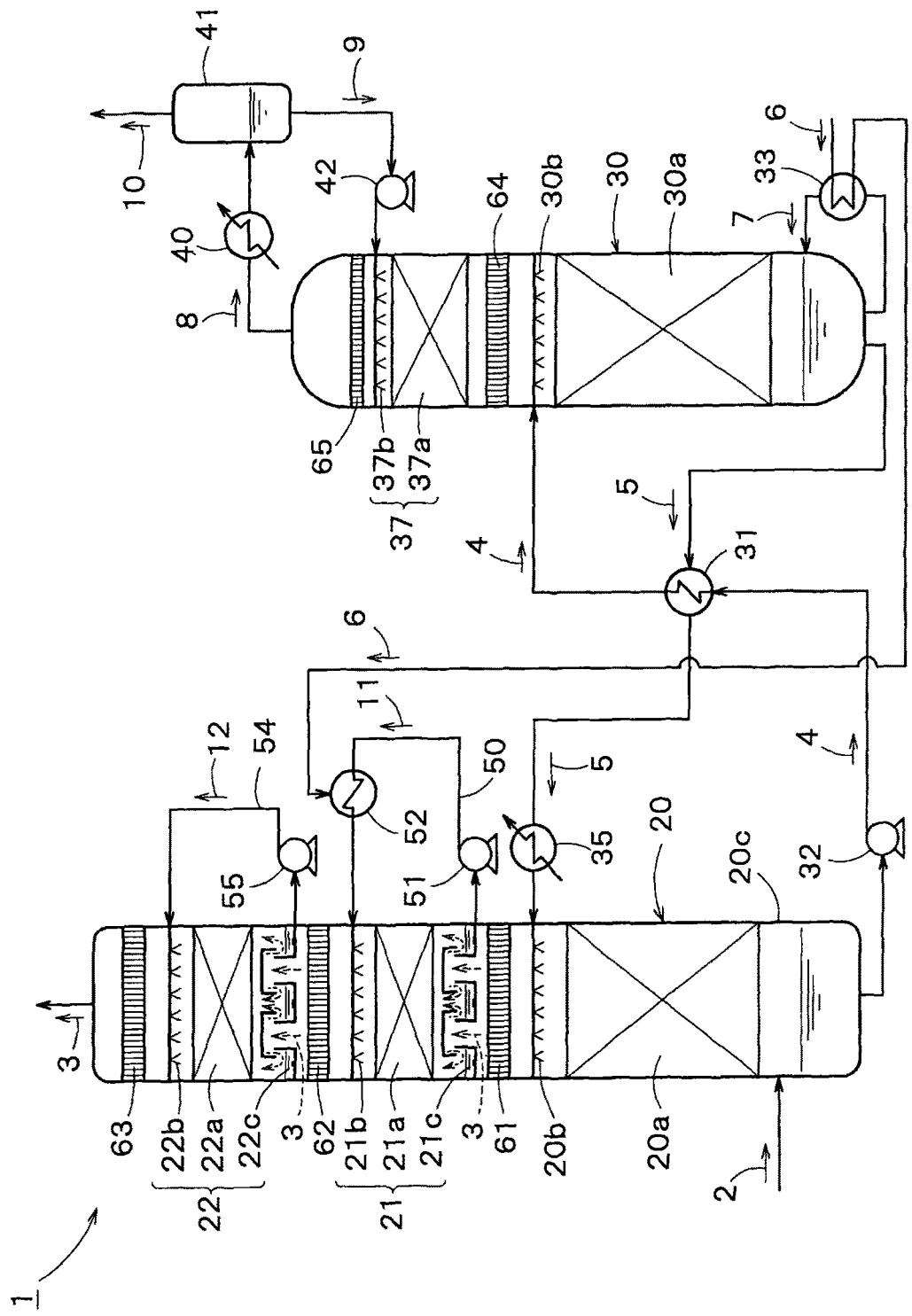
FIG. 2 is a diagram illustrating a modified example of the carbon dioxide capture system illustrated in FIG. 1.

For example, as illustrated in FIG. 2, the heating medium 6 that has heated the lean liquid 5 may be supplied from the reboiler 33 to the heater 52. In this case, the temperature of the first cleaning unit 21 can also be increased while at the same time the waste heat can be effectively used for the energy for heating the first cleaning liquid 11. The heating medium 6 that has passed through the reboiler 33 usually has a higher temperature than the upper portion of the carbon dioxide capturer 20a. The heating medium 6 discharged from the reboiler 33s thus can heat the first cleaning liquid 11 so that the first cleaning liquid 11 has a higher temperature than the upper portion of the carbon dioxide capturer 20a and the second cleaning liquid 12. In FIG. 2, the lean liquid 5 discharged from the heat exchanger 31 is supplied to the lean liquid cooler 35 without being supplied to the heater 52.

For example, as illustrated in FIG. 3, the combustion exhaust gas 2 may be supplied to the heater 52 before being supplied to the carbon dioxide capturer 20a of the absorber 20 as well. In this case, after the first cleaning liquid 11 is heated by the heater 52, the combustion exhaust gas 2 that has heated the first cleaning liquid 11 will be supplied to the carbon dioxide capturer 20a. The temperature of the first cleaning unit 21 can also be increased while at the same time the waste heat can be effectively used for the energy for heating the first cleaning liquid 11 as well. The combustion exhaust gas 2 discharged from the boiler usually has a higher temperature than the upper portion of the carbon dioxide capturer 20a. The combustion exhaust gas 2 discharged from the boiler can thus heat the first cleaning liquid 11 so that the first cleaning liquid 11 has a higher temperature than the upper portion of the carbon dioxide capturer 20a and the second cleaning liquid 12.

Specifically, the combustion exhaust gas discharged from the boiler of the thermal plant passes through apparatuses including a denitrification apparatus, a dedusting apparatus, and a desulfurization apparatus, and is then supplied to the carbon dioxide capture system 1. The temperature of the combustion exhaust gas before the supply of the combustion exhaust gas to the carbon dioxide capture system 1 is approximately in a range of 50° C. to 90° C. For this reason, the combustion exhaust gas 2 is mostly cooled by an exhaust gas cooler (not illustrated) before being supplied to the carbon dioxide capture system 1. In the configuration of FIG. 3, the combustion exhaust gas 2 is cooled by heating the first cleaning liquid 11 in the heater 52. Thus it is possible to reduce the energy for cooling the combustion exhaust gas 2 in the exhaust gas cooler. The exhaust gas cooler can be omitted accordingly. In FIG. 3, the lean liquid 5 discharged from the heat exchanger 31 is supplied to the lean liquid cooler 35 without being supplied to the heater 52 as in FIG. 2.

The first embodiment has described the example in which the second demister 62 is provided between the first liquid diffuser 21b of the first cleaning unit 21 and a second cleaning liquid storage part 22c of the second cleaning unit 22. The first embodiment, however, is not limited to this example. It is not required the second demister 62 is provided. If the second demister 62 is absent, as illustrated in FIG. 1A, the decarbonated combustion exhaust gas 3 discharged from the first cleaning unit 21 will not pass through a demister and be directly supplied to the second cleaning unit 22. Thus, the decarbonated combustion exhaust gas 3 containing a large amount of water can be supplied to the second cleaning unit 22, increasing the amount of the condensed water from the decarbonated combustion exhaust gas 3 in the second cleaning unit 22. The efficiency of cleaning the decarbonated combustion exhaust gas 3 in the second cleaning unit 22 can improve accordingly.

Second Embodiment

A carbon dioxide capture system according to a second embodiment of the invention will now be described with reference to FIG. 4.

Figure 4:
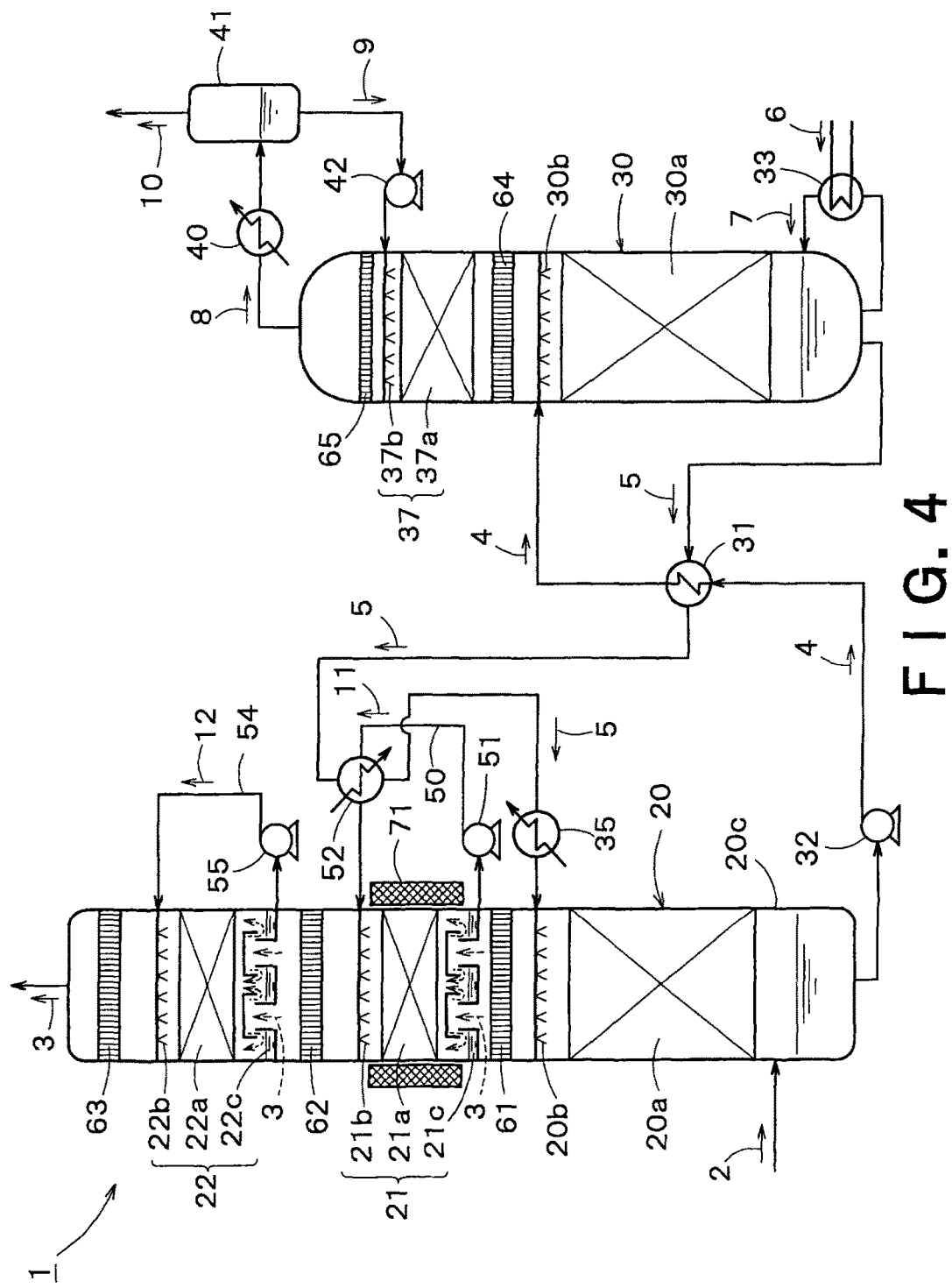
FIG. 4 is a diagram illustrating an overall configuration of a carbon dioxide capture system according to a second embodiment of the invention.

In the second embodiment illustrated in FIG. 4, a first cleaning unit is covered with a first heat insulating material. This feature is mainly different from that of the first embodiment illustrated in FIG. 1, and other configurations are substantially the same as the first embodiment illustrated in FIG. 1. Parts that are illustrated in FIG. 4 and are the same as those in the first embodiment illustrated in FIG. 1 are indicated by the same reference numerals and symbols as the first embodiment illustrated in FIG. 1. A detailed description thereof is thus omitted.

As illustrated in FIG. 4, a first cleaning unit 21 according to the second embodiment is covered with a first heat insulating material 71.

Specifically, the area included in a container 20c of an absorber 20 and facing the first cleaning unit 21 is covered with the first heat insulating material 71. The first heat insulating material 71 is attached to an exterior of the container 20c. The term "heat insulating material" as used herein refers to a member for inhibiting heat transfer between the first cleaning unit 21 and the air. The first heat insulating material 71 can have any configuration with any material as long as the material 71 is capable of inhibiting the heat transfer. A material that has smaller thermal conductivity than the container 20c may also be used for the first heat insulating material 71. With such a material being used, the first heat insulating material 71 can have a stronger effect on inhibiting the heat transfer between the first cleaning unit 21 and the air.

No such a heat insulating material as above covers a second cleaning unit 22. The area that is included in the container 20c of the absorber 20 and facing the second cleaning unit 22 is exposed to the air. This configuration enables heat transfer between the second cleaning liquid 12 and the air so that the second cleaning liquid 12 is naturally cooled and the temperature of the second cleaning liquid 12 is maintained at a level close to an ambient temperature. An increase in the temperature of the second cleaning unit 22 can be thus prevented, enlarging the difference between the temperatures of the first and second cleaning units 21 and 22.

According to the second embodiment, the first heat insulating material 71 covers the first cleaning unit 21. The material 71 can thus prevent the heat transfer between the first cleaning unit 21 and the air and a reduction in the temperature of the first cleaning unit 21. This can further expand the difference between the temperatures of the first and second cleaning units 21 and 22, and increase the amount of condensed water from a decarbonated combustion exhaust gas 3 passing through the second cleaning unit 22.

Third Embodiment

A carbon dioxide capture system according to a third embodiment of the invention will now be described with reference to FIG. 5.

Figure 5:
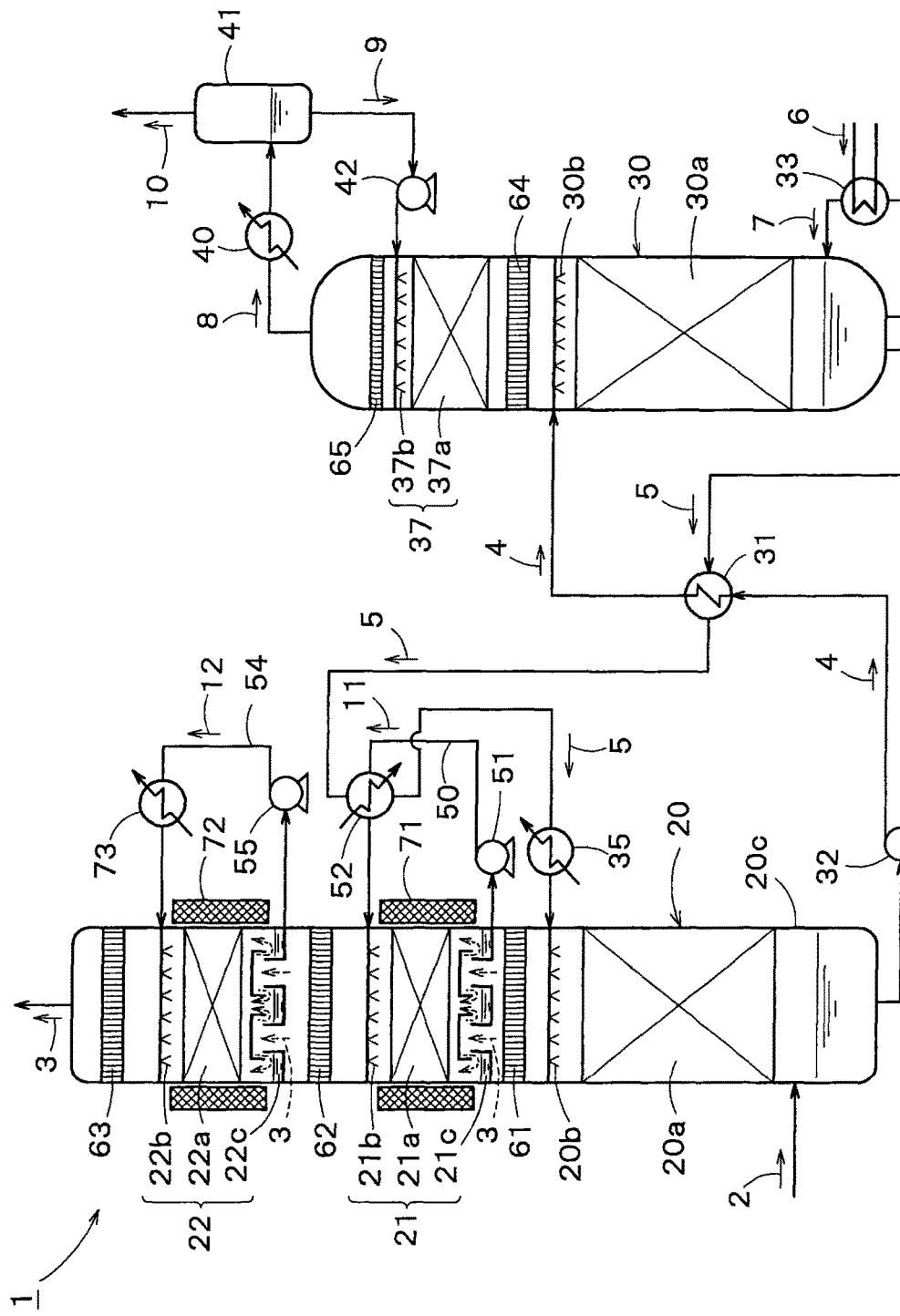
FIG. 5 is a diagram illustrating an overall configuration of a carbon dioxide capture system according to a third embodiment of the invention.

In the third embodiment illustrated in FIG. 5, second cleaning liquid is cooled by a cleaning liquid cooler. This feature is mainly different from that in the second embodiment illustrated in FIG. 4, and other configurations are substantially the same as those in the second embodiment. Parts that are illustrated in FIG. 5 and are the same as the second embodiment illustrated in FIG. 4 are indicated by the same reference numerals and symbols. A detailed description thereof is thus omitted.

As illustrated in FIG. 5, a carbon dioxide capture system 1 according to the third embodiment further includes a cleaning liquid cooler 73 configured to cool the second cleaning liquid 12. The cleaning liquid cooler 73 is in a second circulation line 54. A cooling medium (for example, cooled water of a cooling tower or seawater) for cooling the second cleaning liquid 12 is supplied from an external of the carbon dioxide capture system 1. The cleaning liquid cooler 73 cools the second cleaning liquid 12 flowing in the second circulation line 54. In the third embodiment illustrated in FIG. 5, the cleaning liquid cooler 73 is arranged on the downstream of a second circulation pump 55. The cleaning liquid cooler 73, however, may alternatively be arranged on the upstream of the second circulation pump 55 as long as the second cleaning liquid 12 is sufficiently cooled.

As illustrated in FIG. 5, a second cleaning unit 22 is preferably covered with a second heat insulating material 72.

Specifically, the area included in a container 20c of the absorber 20 and facing the second cleaning unit 22 is covered with the second heat insulating material 72. The second heat insulating material 72 is attached to an exterior of the container 20c. The second heat insulating material 72 may have any configuration with any material as long as the second heat insulating material 72 is capable of inhibiting heat transfer between the second cleaning unit 22 and the air, as with the first heat insulating material 71. A material that has smaller thermal conductivity than the container 20c may be used for the second heat insulating material 72. With such a material being used, the second heat insulating material 72 can have a stronger effect on inhibiting the heat transfer between the second cleaning unit 22 and the air.

According to the third embodiment, the cleaning liquid cooler 73 cools the second cleaning liquid 12. The cleaning liquid cooler 73 can lower the temperature of the second cleaning unit 22. This can further expand the difference between the temperatures of the first and second cleaning units 21 and 22, and increase the amount of the condensed water from the decarbonated combustion exhaust gas 3 passing through the second cleaning unit 22.

In addition, according to the third embodiment, the second heat insulating material 72 covers the second cleaning unit 22. The second heat insulating material 72 can prevent the heat transfer between the second cleaning unit 22 and the air and thus lower the temperature of the second cleaning unit 22. This can further expand the difference between the temperatures of the first and second cleaning units 21 and 22.

Fourth Embodiment

A carbon dioxide capture system according to a fourth embodiment of the invention will now be described with reference to FIG. 6.

Figure 6:
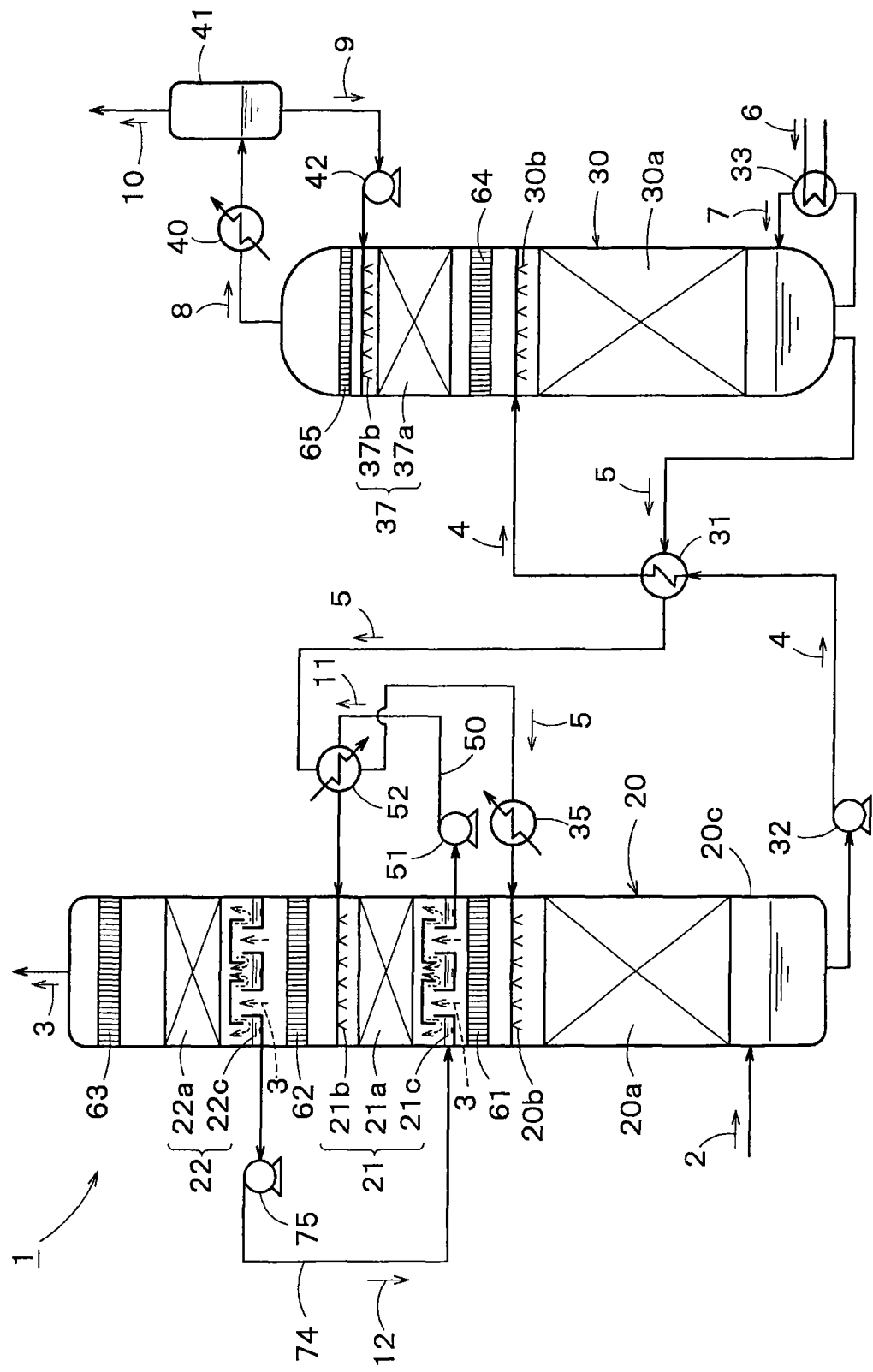
FIG. 6 is a diagram illustrating an overall configuration of a carbon dioxide capture system according to a fourth embodiment of the invention.

In the fourth embodiment illustrated in FIG. 6, the second cleaning liquid stored in a second cleaning liquid storage part of the second cleaning unit is supplied to the first cleaning unit through a bypass line without circulating. This feature is mainly different from that in the first embodiment illustrated in FIG. 1, and other configurations are substantially the same as those in the first embodiment illustrated in FIG. 1. Parts that are illustrated in FIG. 6 and are the same as in the first embodiment are indicated by the same reference numerals and symbols as the first embodiment. A detailed description thereof is thus omitted.

As illustrated in FIG. 6, the fourth embodiment neither provides the second circulation line 54 illustrated in FIG. 1 nor lets second cleaning liquid 12 circulate. Specifically, the second cleaning liquid 12 stored in second cleaning liquid storage part 22c of a second cleaning unit 22 is not supplied through a liquid diffuser to a second capturer 22a. Consequently, the second cleaning liquid 12, after cleaning decarbonated combustion exhaust gas 3 and capturing the amine, is not supplied to the second capturer 22a, thus keeping the amine concentration of the second cleaning liquid 12 in the second capturer 22a low.

The fourth embodiment does not provide the second liquid diffuser 22b (refer to FIG. 1) configured to supply the second cleaning liquid 12 to the second capturer 22a either. The second cleaning liquid 12 is not supplied to the second capturer 22a from an external of the second cleaning unit 22.

The second cleaning liquid 12 in the fourth embodiment contains the condensed water obtained from the decarbonated combustion exhaust gas 3 in the second capturer 22a. Specifically, the water from the decarbonated combustion exhaust gas 3 is condensed as the second cleaning liquid 12 and attached to the surface of the packed bed of the second capturer 22a in the second cleaning unit 22. Consequently, the gas-liquid contact interface of the second cleaning liquid 12, during the condensation, is replaced with the condensed water containing a low concentration of the amine, keeping the amine concentration of the second cleaning liquid 12 on the gas-liquid contact interface low. The second cleaning liquid 12, after cleaning the decarbonated combustion exhaust gas 3 flowing downward from the second capturer 22a, is stored in the second cleaning liquid storage part 22c.

The second cleaning liquid 12 can be replaced with new cleaning liquid to maintain the amine concentration of the second cleaning liquid 12 at a low level. If the second cleaning liquid 12 is replaced with new cleaning liquid, a large amount of a waste liquid will be generated. The second cleaning liquid 12 in the fourth embodiment contains condensed water and thus prevents a large amount of a waste liquid from being produced. Specifically, the second cleaning liquid 12 can prevent a large amount of a waste liquid from being produced while maintaining the amine concentration of the second cleaning liquid 12 at a low level.

Having passed through a first cleaning unit 21, the decarbonated combustion exhaust gas 3 in the second cleaning unit 22 has a lower amine concentration than the decarbonated combustion exhaust gas 3 in the first cleaning unit 21. Yet the high concentration of the second cleaning liquid 12 could cause a lower rate of absorbing the amine. According to the fourth embodiment, however, the second cleaning liquid 12 contains the condensed water, keeping the amine concentration low and curbing a decline in the rate of absorbing the amine from the decarbonated combustion exhaust gas 3 containing a relatively low amine concentration. This makes it possible to efficiently capture the amine and further decrease the amine concentration of the decarbonated combustion exhaust gas 3 discharged from the second cleaning unit 22.

The carbon dioxide capture system 1 according to the fourth embodiment further includes a bypass line 74 configured to supply the first cleaning unit 21 with the second cleaning liquid 12 that has cleaned the decarbonated combustion exhaust gas 3 in the second cleaning unit 22. One end of the bypass line 74 is coupled to the second cleaning liquid storage part 22c of the second cleaning unit 22, while the other end is coupled to the first cleaning liquid storage part 21c of the first cleaning unit 21. The fourth embodiment illustrated in FIG. 6 provides a bypass pump 75 in the bypass line 74. The bypass pump 75 supplies the first cleaning liquid storage part 21c with the second cleaning liquid 12 stored in the second cleaning liquid storage part 22c. The second cleaning liquid 12 then mixes with first cleaning liquid 11 and is reused as the first cleaning liquid 11 in the first cleaning unit 21. If the second cleaning liquid 12 contains the condensed water as described above, the amount of the second cleaning liquid 12 to be supplied to the first cleaning unit 21 can be small, so that the amount of the stored first cleaning liquid 11 cannot be excessively large. Moreover, as long as the second cleaning liquid 12 stored in the second cleaning liquid storage part 22c can be supplied to the first cleaning liquid storage part 21c by gravity, the bypass line 75 may not be required to be provided.

According to the fourth embodiment, the second cleaning liquid 12 stored in the second cleaning liquid storage part 22c of the second cleaning unit 22 is not supplied to the second capturer 22a, and the second cleaning liquid 12 is not circulated. The second cleaning liquid 12, after cleaning the decarbonated combustion exhaust gas 3 and absorbing the amine, cannot be supplied to the second capturer 22a accordingly. This makes it possible to keep low the amine concentration of the second cleaning liquid 12 on the gas-liquid contact interface of the second cleaning liquid and prevent a decline in the rate of absorbing the amine. The amount of the amine captured in the second cleaning unit 22 can consequently increase, and the amount of the amine to be released into the air can decrease.

In addition, according to the fourth embodiment, the second cleaning liquid 12 after cleaning the decarbonated combustion exhaust gas 3 in the second cleaning unit 22, is supplied through the bypass line 74 to the first cleaning unit 21. The second cleaning liquid 12 having a relatively low amine concentration can consequently mix with the first cleaning liquid 11 so as to make the amine concentration of the first cleaning liquid 11 low. This can prevent a decline in the rate of absorbing the amine in the first cleaning unit 21 and thus enlarge the amount of the amine captured in the first cleaning unit 21.

Fifth Embodiment

A carbon dioxide capture system according to a fifth embodiment of the invention will now be described with reference to FIG. 7.

In the fifth embodiment illustrated in FIG. 7, third cleaning liquid to be used in a third cleaning unit contains an acid. This feature is mainly different from that in the first embodiment illustrated in FIG. 1, and other configurations are substantially the same as those in the first embodiment. Parts that are illustrated in FIG. 7 and are the same as the first embodiment illustrated in FIG. 1 are indicated by the same reference numerals and symbols as in the first embodiment illustrated in FIG. 1. A detailed description thereof is thus omitted.

As illustrated in FIG. 7, the absorber 20 according to the fifth embodiment includes a third cleaning unit 23 configured to use third cleaning liquid 13 to clean decarbonated combustion exhaust gas 3 discharged from a second cleaning unit 22 and capture an amine flowing together with the decarbonated combustion exhaust gas 3. Specifically, the third cleaning unit 23 is provided above the second cleaning unit 22 and a third demister 63.

The third cleaning unit 23, having a similar configuration as the second cleaning unit 22, includes a third capturer 23a (packed bed), a third liquid diffuser 23b, and a third cleaning liquid storage part 23c. The third capturer 23a is configured to enable the third cleaning liquid 13 and the decarbonated combustion exhaust gas 3 to contact each other and capture the amine that is the absorbing liquid component flowing together with the decarbonated combustion exhaust gas 3. The third liquid diffuser 23b is arranged above the third capturer 23a and configured to diffuse and drop the third cleaning liquid 13 toward the third capturer 23a. The third cleaning liquid storage part 23c is arranged under the third capturer 23a and configured to store the third cleaning liquid 13 that has flowed downward from the third capturer 23a.

The third cleaning unit 23 is coupled to a third circulation line 57 configured to circulate the third cleaning liquid 13. Specifically, a third circulation pump 58 is arranged in the third circulation line 57 and configured to extract the third cleaning liquid 13 stored in the third cleaning liquid storage part 23c and supply the third cleaning liquid 13 to the third liquid diffuser 23b so as to enable the third cleaning liquid 13 to circulate. The third cleaning liquid 13 supplied to the third liquid diffuser 23b is diffused and dropped by the third liquid diffuser 23b and supplied to the third capturer 23a.

Such a configuration cleans the decarbonated combustion exhaust gas 3 discharged from the second cleaning unit 22 by the third cleaning liquid 13. The third cleaning liquid 13 then absorbs and captures the amine. The third cleaning unit 23 has the similar configuration as the second cleaning unit 22, and a detailed description thereof is omitted. A sixth demister 66 is positioned at an outlet of the third cleaning unit 23, which is above the third liquid diffuser 23b. The sixth demister 66 allows the decarbonated combustion exhaust gas 3 discharged from the third capturer 23*a* to pass through and ascend. At this time, the sixth demister 66 captures mist of the absorbing liquid flowing together with the decarbonated combustion exhaust gas 3, mist of the first cleaning liquid 11, mist of the second cleaning liquid 12, and mist of the third cleaning liquid 13.

The third cleaning liquid 13 contains an acid. Examples of the acid added to the third cleaning liquid 13 are a sulfuric acid, a nitric acid, a phosphoric acid, an acetic acid, and a boric acid. It is preferable that the acid added to the third cleaning liquid 13 have a predetermined concentration. The third cleaning liquid 13 having the acid added thereto is preferably managed using a pH meter, an ultrasonic meter, an infrared light absorption meter, a density meter, or other devices, but is particularly preferably managed using the pH meter. The addition of the acid lowers the pH value of the third cleaning liquid 13, although the amine has an alkaline property. The higher amine concentration of the third cleaning liquid 13 thus tends to elevate the pH value. The amine concentration of the third cleaning liquid 13 can be easily managed by controlling the pH value. For example, a decline in the rate of absorbing the amine can be efficiently prevented by managing the amine concentration so as to set the pH value to 8 or lower, preferably 7 or lower.

According to the fifth embodiment, the third cleaning liquid 13 that captures the amine flowing together with the decarbonated combustion exhaust gas 3 discharged from the second cleaning unit 22 contains the acid. This makes it possible to prevent a decline in the rate of absorbing the amine from the decarbonated combustion exhaust gas 3 that has a decreased amine concentration after passing through the second cleaning unit 22. Thus, the amine can be efficiently captured and the amine concentration of the decarbonated combustion exhaust gas 3 discharged from the third cleaning unit 23 can be further reduced.

The fifth embodiment has described the example in which the third cleaning unit 23 is arranged above the second cleaning unit 22, and the third cleaning liquid 13 for cleaning the decarbonated combustion exhaust gas 3 in the third cleaning unit 23 contains the acid. The fifth embodiment, however, is not limited to this example. In the event that the third cleaning unit 23 is not provided, the second cleaning liquid 12 used in the second cleaning unit 23 may contain the acid instead. The amine can still be efficiently captured, and the amine concentration in the decarbonated combustion exhaust gas 3 discharged from the second cleaning unit 22 can be further reduced. If multiple cleaning units are arranged within the absorber 20, the cleaning liquid used in a top cleaning unit preferably contains the acid.

Sixth Embodiment

A carbon dioxide capture system according to a sixth embodiment of the invention will now be described with reference to FIG. 8.

Figure 8:
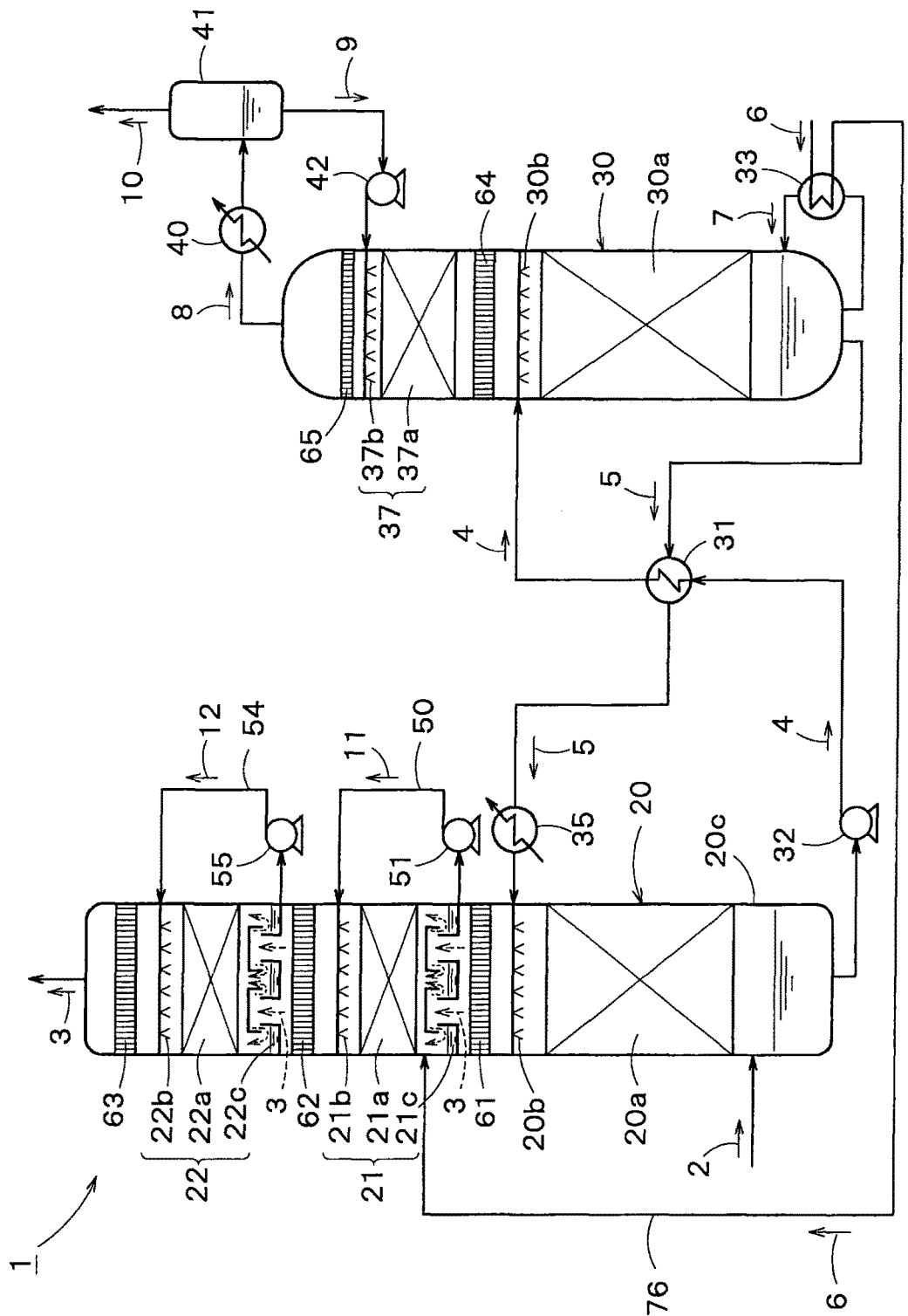
FIG. 8 is a diagram illustrating an overall configuration of a carbon dioxide capture system according to a sixth embodiment of the invention.

In the sixth embodiment illustrated in FIG. 8, a heating medium that has heated an absorbing liquid is supplied from a reboiler to a second cleaning unit and mixes with first cleaning liquid. This feature is mainly different from that in the first embodiment illustrated in FIG. 1, and other configurations are substantially the same as those in the first embodiment illustrated in FIG. 1. Parts that are illustrated in FIG. 8 and are the same as those in the first embodiment illustrated in FIG. 1 are indicated by the same reference numerals and symbols as the first embodiment illustrated in FIG. 1. A detailed description thereof is thus omitted.

In the sixth embodiment, a heating medium supply line 76 is provided instead of the heater 52 illustrated in FIG. 1, and first cleaning liquid 11 is supplied by a heating medium 6 supplied from a reboiler 33.

Specifically, as illustrated in FIG. 8, a heating unit includes the heating medium supply line 76 configured to supply a first cleaning unit 21 with the heating medium 6 that has heated the lean liquid 5 from the reboiler 33 and allow the heating medium 6 to mix with the first cleaning liquid 11. One end of the heating medium supply line 76 is coupled to a heating medium discharger of the reboiler 33, while the other end is coupled to an area included in the container 20*c* of the absorber 20 and located between a first capturer 21*a* and first cleaning liquid storage part 21*c* of the first cleaning unit 21.

This configuration allows the heating medium 6 that has passed through the heating medium supply line 76 from the reboiler 33 to be supplied to the area between the first capturer 21*a* and first cleaning liquid storage part 21*c* of the first cleaning unit 21. The heating medium 6 then flows downward and is stored in the first cleaning liquid storage part 21*c*. Consequently, the heating medium 6 with a relatively high temperature mixes with the first cleaning liquid 11 and heats the first cleaning liquid 11, so that the temperature of the first cleaning liquid 11 increases. The heating medium 6 that has passed through the reboiler 33 usually has a higher temperature than the upper portion of a carbon dioxide capturer 20*a*. In this manner, the heating medium supply line 76 heats the first cleaning liquid 11 to make the first cleaning liquid 11 have a higher temperature than the upper portion of the carbon dioxide capturer 20*a* and the second cleaning liquid 12.

According to the sixth embodiment, the heating medium 6 that has heated the lean liquid 5 is supplied from the reboiler 33 through the heating medium supply line 76 to the first cleaning unit 21. The heating medium 6 with the relatively high temperature can then mix with the first cleaning liquid 11 and heat the water 11 to a higher temperature. This can consequently increase the temperature of the first cleaning unit 21, expanding the difference between the temperatures of the first and second cleaning units 21 and 22, and increasing the amount of the condensed water obtained from the decarbonated combustion exhaust gas 3 that passes through the second cleaning unit 22. On top of that, the heating medium 6, directly supplied to the first cleaning liquid 11 to mix with the water 11, can directly heat the first cleaning liquid 11, thus improving the efficiency of heating the first cleaning liquid 11.

According to the aforementioned embodiments, the amount of the amine released into the air can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Further, it will be understood that these embodiments can be at least partially combined properly without departing from the spirit of the present invention.

The invention claimed is:

1. A carbon dioxide capture system comprising:
a carbon dioxide capturer configured to cause carbon dioxide contained in combustion exhaust gas to be absorbed in an absorbing liquid containing amine and to discharge the combustion exhaust gas as decarbonated combustion exhaust gas;
a first cleaning unit configured to capture the amine flowing together with the decarbonated combustion exhaust gas discharged from the carbon dioxide capturer into first cleaning liquid supplied at a first temperature higher than a temperature at an upper portion of the carbon dioxide capturer,
a second cleaning unit configured to capture the amine flowing together with the decarbonated combustion exhaust gas discharged from the first cleaning unit into second cleaning liquid supplied at a second temperature lower than the first temperature,
a heater configured to heat the first cleaning liquid to the first temperature and to discharge the first cleaning liquid to the first cleaning unit,
a stripper configured to cause the carbon dioxide to be released from the absorbing liquid supplied from the carbon dioxide capturer; and
a reboiler configured to heat the absorbing liquid within the stripper with a heating medium and to discharge the heating medium therefrom,
wherein the heater includes a heating medium supply line configured to supply the heating medium from the reboiler to the first cleaning unit, and to mix the heating medium with the first cleaning liquid.

2. The carbon dioxide capture system according to claim 1, further comprising
a demister provided between the first cleaning unit and the second cleaning unit and configured to capture mist flowing together with the decarbonated combustion exhaust gas discharged from the first cleaning unit.

3. The carbon dioxide capture system according to claim 1, further comprising
a demister provided above the second cleaning unit and configured to capture mist flowing together with the decarbonated combustion exhaust gas discharged from the second cleaning unit.

4. The carbon dioxide capture system according to claim 1,
wherein the first cleaning unit and the second cleaning unit are so configured that the decarbonated combustion exhaust gas discharged from the first cleaning unit is directly supplied to the second cleaning unit.

5. The carbon dioxide capture system according to claim 1,
wherein the first cleaning unit is covered with a heat insulating material.

6. The carbon dioxide capture system according to claim 1, further comprising
a cleaning liquid cooler configured to cool the second cleaning liquid.

7. The carbon dioxide capture system according to claim 6,
wherein the second cleaning unit is covered with a heat insulating material.

8. The carbon dioxide capture system according to claim 1,
wherein the second cleaning unit comprises:
an amine capturer configured to capture the amine flowing together with the decarbonated combustion exhaust gas; and
a cleaning liquid storage part provided below the amine capturer and configured to store the second cleaning liquid flowing downward from the amine capturer.

9. The carbon dioxide capture system according to claim 8, further comprising
a bypass line configured to supply the second cleaning liquid from the cleaning liquid storage part of the second cleaning unit to the first cleaning unit.

10. The carbon dioxide capture system according to claim 1, further comprising
a third cleaning unit configured to capture the amine flowing together with the decarbonated combustion exhaust gas discharged from the second cleaning unit into third cleaning liquid containing an acid.

* * * * *